(12) United States Patent
Bousset

(10) Patent No.: US 9,758,130 B2
(45) Date of Patent: Sep. 12, 2017

(54) SECURING DEVICE BETWEEN A WIPER BLADE AND A SUPPORT CONSTITUTING A WINDSCREEN WIPER

(71) Applicant: Valeo Systèmes d'Essuyage, Le Mesnil Saint Denis (FR)

(72) Inventor: Xavier Bousset, Mezel (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 5 days.

(21) Appl. No.: 14/883,841

(22) Filed: Oct. 15, 2015

(65) Prior Publication Data

US 2016/0107614 A1 Apr. 21, 2016

(30) Foreign Application Priority Data

Oct. 16, 2014 (FR) ...................................... 14 59930

(51) Int. Cl.
*B60S 1/38* (2006.01)
(52) U.S. Cl.
CPC ............... *B60S 1/38* (2013.01); *B60S 1/3891* (2013.01); *B60S 1/3893* (2013.01); *B60S 1/3889* (2013.01);
(Continued)
(58) Field of Classification Search
CPC .... B60S 1/3891; B60S 1/3893; B60S 1/3889; B60S 1/3896; B60S 1/3858; B60S 1/3856
See application file for complete search history.

(56) References Cited

U.S. PATENT DOCUMENTS

| 8,381,350 B2 * | 2/2013 | Op't Roodt | B60S 1/3858 |
| | | | 15/250.32 |
| 2007/0240271 A1 * | 10/2007 | Wilms | B60S 1/38 |
| | | | 15/145 |

(Continued)

FOREIGN PATENT DOCUMENTS

| DE | 10058208 B4 * | 6/2009 | ............... B60S 1/38 |
| DE | 102012205835 A1 | 10/2013 | |

(Continued)

OTHER PUBLICATIONS

WO2012130797A1 (machine translation), 2012.*

(Continued)

*Primary Examiner* — Andrew A Horton
(74) *Attorney, Agent, or Firm* — Osha Liang LLP

(57) ABSTRACT

The subject of the invention is notably a securing device (10) between a wiper blade (12) and a wiper blade support (14) constituting a windscreen wiper, said device (10) comprising a first part (20) suitable for being fixed onto said support (14) and a second part (22) suitable for being fixed onto said blade, said first (20) and second (22) parts being linked by a removable link means (52, 54, 56), said second part (22) comprising a groove (26) for insertion, by translation in a first direction, of a complementary part (18) of said blade (12), said device (10) comprising a means for immobilizing, in translation in said first direction, said blade in said groove, characterized in that said immobilizing means comprises at least one immobilizing element (28) mounted to slide on said second part (22), in translation substantially at right angles to said first direction, between a retracted position allowing the displacement of said complementary part (18) of the blade in said groove (26) and a position of translationally immobilizing said complementary part (18) of the blade in said groove (26).

12 Claims, 2 Drawing Sheets

Figure 4:
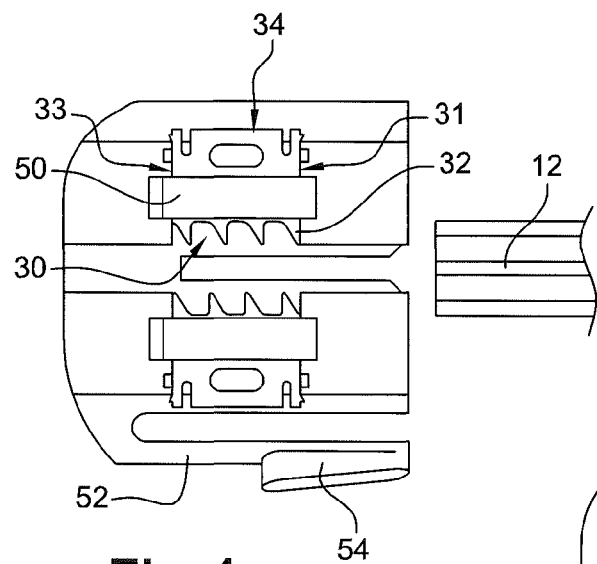

(52) U.S. Cl.
CPC ...... *B60S 1/3896* (2013.01); *B60S 2001/3822* (2013.01)

(56) References Cited

U.S. PATENT DOCUMENTS

2014/0047663 A1 2/2014 Espinasse
2014/0090200 A1 4/2014 Espinasse

FOREIGN PATENT DOCUMENTS

| FR | 2905650 A1 | 3/2008 |
| WO | 2007031260 A1 | 3/2007 |
| WO | 2012130797 A1 | 10/2012 |

OTHER PUBLICATIONS

DE102012205835 (machine translation), 2013.*
Preliminary Search Report issued in corresponding French Application No. 1459930, dated Jun. 9, 2015 (2 pages).

* cited by examiner

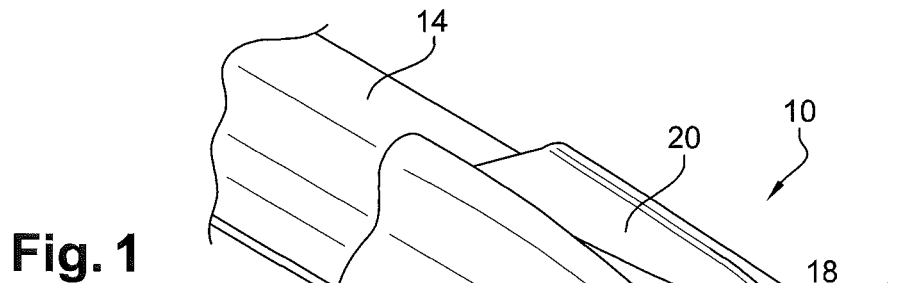
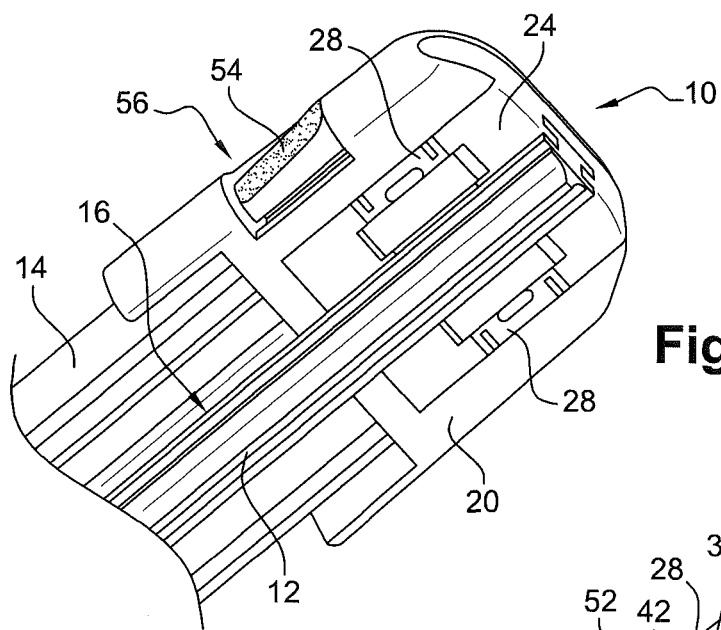
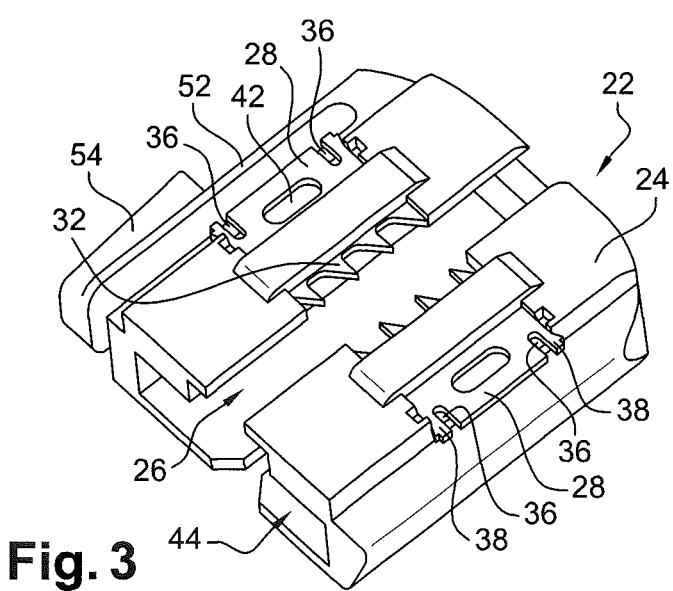

SECURING DEVICE BETWEEN A WIPER BLADE AND A SUPPORT CONSTITUTING A WINDSCREEN WIPER

The present invention relates to the technical field of equipment for wiping a window of a motor vehicle.

A motor vehicle is commonly equipped with at least one windscreen wiper to ensure the wiping and washing of the windscreen.

The windscreen wiper comprises, as is known, a driving arm performing an angular to-and-fro movement and an elongate wiper comprising a wiper blade made of elastomer-based material.

The wiper and the driving arm are linked by articulation means comprising two link members articulated together about an articulation axis, usually called connector and adapter.

The wiper comprises, in addition to the wiper blade, a semi-rigid assembly comprising at least one blade stiffening element, also called stiffening spine, the function of which is to ensure the contact of the blade with the windscreen, over the entire length of the blade.

The arm drives the wiper in the angular to-and-fro movement and the blade, rubbing against the windscreen, dispels the water present on the windscreen out of the field of view of the driver.

When the wiping quality becomes degraded, the wiper blade is replaced. It is therefore desirable to secure the wiper blade to the semi-rigid assembly with means allowing for an easy replacement of the blade.

Thus, a device forming a support for a windscreen wiper blade is known from the document WO 2007031260. The device comprises a constituent support of the windscreen wiper, in which support is formed a first groove for insertion, in translation in a so-called longitudinal direction, of a complementary part of the blade. It also comprises a first part comprising link means with the constituent support of the windscreen wiper as well as a blade-immobilizing member. This immobilizing member comprises a body comprising means for linking with the first part, in which is formed a second groove for insertion, in translation in the longitudinal direction, of the complementary part of the blade, this second groove extending in the extension of the first groove, and the means for translationally immobilizing the blade in the second groove. The immobilizing member and the means for translationally immobilizing the blade are made of metal and the member is clamped onto the blade by deformation of the member. However, this device is relatively complex to manufacture and the clamping of the device on the blade may not always be done correctly.

The aim of the invention is to provide a device for securing a windscreen wiper blade on a windscreen wiper blade support that is more reliable while being simple to use.

To this end, the subject of the invention is a securing device between a wiper blade and a wiper blade support constituting a windscreen wiper, said device comprising a first part suitable for being fixed onto said support and a second part suitable for being fixed onto said blade, said first and second parts being linked by a removable link means, said second part comprising a groove for insertion, by translation in a first direction, of a complementary part of said blade, said device comprising a means for immobilizing, in translation in said first direction, said blade in said groove, in which said immobilizing means comprises at least one immobilizing element mounted to slide on said second part between a retracted position allowing the displacement of said complementary part of the blade in said groove and a position of translationally immobilizing said complementary part of the blade in said groove.

Thus, a device is obtained that is simple to use. In effect, the translational immobilizing of the blade in the second part of the securing device is obtained by a simple displacement of the immobilizing element between the retracted position and the immobilizing position.

Once the immobilizing element is in the immobilizing position, the blade is translationally immobilized relative to the second part of the securing device.

Furthermore, the second part of the securing device comprising a means for linking with the first part of said device and said first part comprising a means for linking with the support constituting the windscreen wiper, once these different link means are activated and the immobilizing element is in the immobilizing position, the windscreen wiper blade is secured simply and reliably with the constituent support of the windscreen wiper blade.

The device according to the invention can further comprise one or more of the following features, taken alone or in combination:

said groove for insertion of said second part is configured to directly retain said complementary part of said wiper blade. Preferably, said groove for insertion comprises two ridges facing one another with an "L"-shaped cross section constituting retaining hooks for said complementary part of said wiper blade.

the immobilizing element is mounted to slide on said second part in translation substantially at right angles to said first direction, between said retracted position and said immobilizing position.

at least one of said first and second parts is made of plastic material. They can thus be moulded and easily given the desired geometry.

said second part is overmoulded on the immobilizing element. By virtue of the fact that said second part is overmoulded on the immobilizing element, the immobilizing element is positioned directly in the mould and, after the moulding of the body, the two parts are added together on the windscreen wiper blade. The operation is therefore simple and there is no risk of losing a part when replacing the windscreen wiper blade.

the immobilizing element is made of metal. This means that the immobilizing element can assume its immobilizing position by relatively easily penetrating into the windscreen wiper blade which is generally made of elastomer-based material.

the device comprises two immobilizing elements arranged on either side of said groove. Thus, when they each assume their immobilizing position, the immobilizing elements pinch the windscreen wiper blade between them and the blade is translationally immobilized in said groove of the second part.

the immobilizing element is of substantially planar form and comprises an edge bearing at least one tooth intended to be sunk into the blade when the immobilizing element is in the immobilizing position. This tooth or the plurality of teeth, preferably oriented at right angles to the longitudinal direction, allows/allow the immobilizing element to be sunk into the wiper blade and immobilize any translational movement of the blade relative to the second part.

said second part and the immobilizing element comprise complementary means for holding the immobilizing element in the immobilizing position. Thus, once the immobilizing element is in the immobilizing position, it can no longer assume its retracted position. The blade is thus immobilized in said second part permanently.

the complementary means for holding in the immobilizing position are snap-fitting means. These means are means that are simple to produce and effective. For example, the immobilizing element comprises a tab provided with a key which cooperates with a notch formed in said second part. Advantageously, the immobilizing element comprises two tabs, each provided with a key which cooperates with a corresponding notch.

the second part of the securing device and the immobilizing element comprise complementary means for holding the immobilizing element in the retracted position. Thus, when handling the second part of the securing device, notably before insertion of the blade, the risks of separation of the constituent support of the windscreen wiper and the immobilizing element are greatly reduced.

the means for linking the body with the first part is produced in the form of snap-fitting means. They comprise, for example, an elastic tab borne by said second part which cooperates with a window formed in the first part.

the means for linking the first part of the securing device with said constituent support of the windscreen wiper are snap-fitting means.

The invention also relates to a windscreen wiper comprising a device as defined previously.

Figure 5:
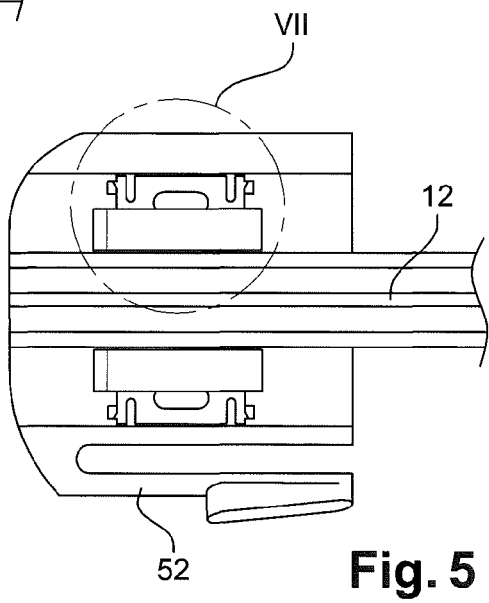
Figure 6:
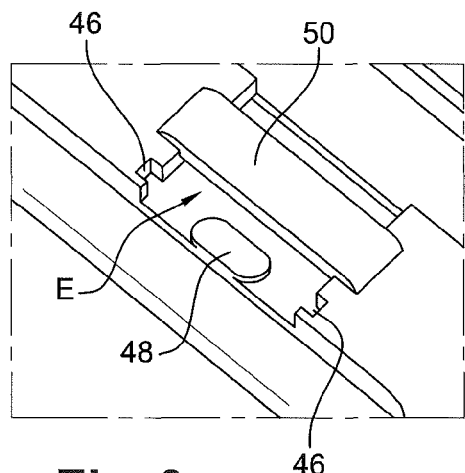
Figure 7:
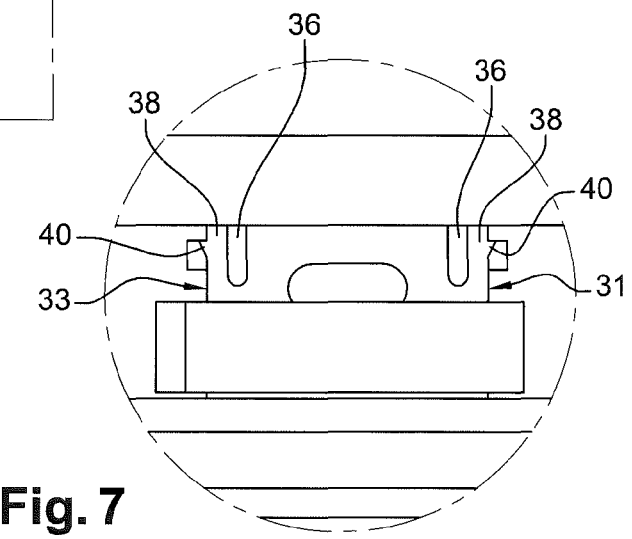

The invention will be better understood on reading the following description, given purely by way of example that is nonlimiting on the scope of the invention and with reference to the drawings, in which:

FIG. 1 is a perspective view from above of an end of a device according to the invention, FIG. 2 is a perspective view from below of the end of the device of FIG. 1, FIG. 3 is a perspective view from below of a second part of the link device according to the invention, the immobilizing elements being in the retracted position, FIG. 4 is a view from below of a second part of the link device and of a windscreen wiper blade before insertion of the blade, the immobilizing elements being in the retracted position, FIG. 5 is a view from below of the second part of the link device and of the blade, the blade being inserted into the groove and the immobilizing elements being in the immobilizing position, FIG. 6 is a partial enlargement of the body of the second part of the link device showing the complementary means for holding the immobilizing element (not represented) in the retracted position, borne by the body of the second part of the link device, FIG. 7 is a larger scale view of a detail of FIG. 5 showing the complementary means for holding the immobilizing element (this time represented) in the immobilizing position.

FIGS. 1 and 2 show an end of a device 10 forming a support for a windscreen wiper blade 12. This device 10 comprises a constituent support of the windscreen wiper 14 in which is formed a groove 16, called first groove, for insertion, by translation in a longitudinal direction, of a complementary part 18 of the blade 12. The device 10 also comprises a first part 20 comprising, in this example, a releasable link means with the support 14 constituting the windscreen wiper.

The device 10 further comprises a second part, represented in FIG. 3, comprising a body 24 in which is formed a groove 26, called second groove, for insertion, by translation in the longitudinal direction, of the complementary part 18 of the blade 12. Said second groove 26 extends in the extension of said first groove 16. The second part 22 also comprises a means for translationally immobilizing the blade 12 in said second groove 26. The translationally immobilizing means comprises, in this example, two immobilizing elements 28 mounted to slide in translation on the body 24, substantially at right angles to the longitudinal direction. As a variant, a single element 28 could be provided.

In FIG. 2, the immobilizing elements 28 are represented in the position of immobilization of the complementary part 18 of the blade 12 whereas, in FIG. 3, the immobilizing elements 28 are represented in the retracted positions allowing the displacement of the complementary part 18 of the blade in said second groove 26.

There now follows a more detailed description of the second part 22 with reference to FIGS. 3 to 7.

Each immobilizing element 28 is, in this exemplary embodiment, of substantially planar and rectangular form delimited by four edges, with one edge 30 bearing a plurality of teeth 32. In the example illustrated, the edge 30 bears four teeth 32 oriented at right angles to the longitudinal direction. The teeth 32 are intended to be at least partially sunk into the blade 12 when the immobilizing element 28 is in the immobilizing position. The edge 34 of the immobilizing element 28, opposite the edge 30, comprises two notches 36. The opposite edges 30 and 34 are linked together by two edges 31, 33 parallel to one another and to the direction of displacement of the elements 28. These edges 31, 33 form a means for translationally guiding the element 28 cooperating with a complementary guiding means formed on the body 24, more particularly the lateral edges of a void E formed in the body 24. Each notch 36 delimits a tab 38 with one of the edges 31, 33 of the immobilizing element. Each tab 38 comprises a key 40 which forms a means for holding the immobilizing element 28 in the immobilizing position. The immobilizing element 28 also comprises an oblong hole 42 which forms a means for holding the immobilizing element 28 in the retracted position. In this example, the immobilizing elements 28 are made of metal.

The body 24 is of substantially parallelepipedal form and produced, for example, in plastic material by overmoulding of the body 24 on the immobilizing elements 28.

It comprises, in its median part, said second groove 26 and also a recess 44 of substantially parallelepipedal form intended to receive a stiffening spine of the windscreen wiper. The second groove 26 and the recess 44 are oriented in the longitudinal direction. It will be noted that, on either side of said second groove 26, the body 24 comprises a void E for receiving a corresponding immobilizing element 28.

As is represented in FIG. 6, each void E comprises, on each of its lateral edges, a notch 46 forming a means for holding the immobilizing element in the immobilizing position that complements the key 40 borne by the element 28.

The body 24 also comprises a clamp 50 produced of a piece with the rest of the body 24 partially closing the void E. The clamp 50 makes it possible to hold the immobilizing element 28 in the void E while retaining a degree of freedom of the immobilizing element 28 at right angles to the longitudinal direction in a sliding movement translation on the body 24.

The void E also comprises a means for holding the immobilizing element in the retracted position. In this example, the means for holding in the retracted position comprise a boss 48 of a form complementing the form of the oblong hole 42 of the immobilizing element 28.

Thus, the immobilizing element 28 is held in the retracted position in the void E of the body 24 by virtue of the cooperation of the complementary means for holding in the retracted position borne by the immobilizing element 28 and the body 24, namely, respectively, the oblong window 42 and the boss 48. The risks of separation of the body 24 and of the immobilizing element 28, notably before insertion of the blade 12 into said second groove 26, are therefore greatly reduced.

In the immobilizing position, the cooperation of the complementary means for holding in the immobilizing position borne by the immobilizing element 28 and the body 24, namely, respectively, each key 40 borne by a tab 38 and the notch 46, makes it possible to immobilize the immobilizing element 28 in the immobilizing position such that the immobilizing element 28 can no longer revert to its retracted position accidentally. These complementary means for holding in the immobilizing position are therefore, in this example, snap-fitting means.

The body 24 further comprises an elastic tab 52 bearing, on its free end, a key 54 intended to cooperate with a window 56 of the first part 20. The tab 52, the key 54 and the window 56 form the releasable means for linking the body 24 with the first part 20, in this case by snap-fitting of the key 54 in the window 56.

To manufacture the second part 22, advantageously, the immobilizing elements 28 are manufactured in metal, they are arranged in the injection mould of the body 24 and the body 24 is overmoulded with plastic material on the immobilizing elements 28. This method is easy to carry out and makes it possible to avoid the step of assembly of the immobilizing elements 28 and of the body 24 when the immobilizing elements 28 and the body 24 are produced separately.

To secure a new windscreen wiper blade 12 on the support 14 constituting the windscreen wiper according to the above example, the procedure is as follows.

The complementary part 18 of the blade 12 is inserted by translation in the longitudinal direction into the first groove 16 of the support 14. The complementary part 18 of the blade 12 is then inserted by translation into said second groove 26 of the second part 22, the immobilizing elements 28 being in the retracted position. Once the blade 12 is correctly inserted into said second groove 26, using a suitable tool, the immobilizing elements 28 are switched to the position of immobilization of the blade in translation by sliding them in translation over the body 24, at right angles to the longitudinal direction in this example such that the teeth 32 are sunk at least partially into the blade 12 and the immobilizing elements 28 pinch the blade 12 between them and prevent any translational movement of the blade 12 in the second part 22. It is easy to check that the immobilizing elements 28 are in the immobilizing position by checking that the keys 40 borne by the tabs 38 of each immobilizing element 28 do indeed cooperate with the respective notches 46 of the body 24. The first part 20 is then added to the second part 22 such that the snap-fitting means forming the means for linking the body 24 with the first part 20 cooperate with one another. The first part 20 is then added to the support 14 such that the means for linking the first part 20 with the support 14 is active. The new blade 12 is thus secured to the support 14.

It will therefore be understood that, by virtue of the device of the invention, the securing of a new blade 12 to the support 14 is performed simply and reliably.

The invention is not limited to the embodiments presented and other embodiments will be clearly apparent to those skilled in the art. It is notably possible to translationally immobilize the blade 12 in the second part 22 before inserting the blade 12 into the first groove 16 of the support 14. It will also be noted that the means for linking the body 24 with the first part 20 described is for example formed by snap-fitting means, but this example is not limiting. The same applies for the complementary means for holding the immobilizing element in the immobilizing position or in the retracted position.

The invention claimed is:

1. A securing device between a wiper blade and a wiper blade support constituting a windscreen wiper, said device comprising:
   a first part fixed onto said support;
   a second part fixed onto said blade, said first and second parts being linked by a removable link means,
      said second part comprising a groove for insertion, by translation in a first direction, of a complementary part of said blade; and
   a means for immobilizing, in translation in said first direction, said blade in said groove, wherein said immobilizing means comprises at least one immobilizing element mounted to slide on said second part between a retracted position allowing the displacement of said complementary part of the blade in said groove and a position of translationally immobilizing said complementary part of the blade in said groove,
   wherein the at least one immobilizing element is of substantially planar form and comprises an edge bearing a plurality of teeth intended to be sunk into the blade when the at least one immobilizing element is in the immobilizing position.

2. The device according to claim 1, in which the at least one immobilizing element is mounted to slide on said second part in translation substantially at right angles to said first direction, between said retracted position and said immobilizing position.

3. The device according to claim 1, in which at least one of said first and second parts is made of plastic material.

4. The device according to claim 1, in which said second part is overmoulded on the at least one immobilizing element.

5. The device according to claim 1, in which the at least one immobilizing element is made of metal.

6. The device according to claim 1, wherein the at least one immobilizing element comprises two immobilizing elements arranged respectively on either side of said groove.

7. The device according to claim 1, in which said second part and the at least one immobilizing element comprise complementary means for holding the at least one immobilizing element in the immobilizing position.

8. The device according to claim 7, in which the complementary holding means are produced in the form of snap-fitting means.

9. The device according to claim 1, in which said second part and the at least one immobilizing element comprise complementary means for holding the at least one immobilizing element in the retracted position.

10. The device according to claim 1, in which said removable means for linking said first and second parts is produced in the form of snap-fitting means.

11. The device according to claim 1, in which said first part is suitable for being fixed onto said support by insertion.

12. A windscreen wiper comprising a wiper blade and a support constituting a windscreen wiper and in which said blade is secured onto said support by the device according to claim 1.

* * * * *